(12) United States Patent
Allen

(10) Patent No.: US 10,981,210 B1
(45) Date of Patent: Apr. 20, 2021

(54) SWAGE PIN HAVING RIBBED TAPER FOR HELICAL SWAGE PROCESS

(71) Applicant: Western Digital Technologies, Inc., San Jose, CA (US)

(72) Inventor: Kenneth Allen, Felton, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 269 days.

(21) Appl. No.: 16/012,661

(22) Filed: Jun. 19, 2018

(51) Int. Cl.
  *B21D 39/06*  (2006.01)
  *G11B 5/48*  (2006.01)

(52) U.S. Cl.
  CPC ............ *B21D 39/06* (2013.01); *G11B 5/4826* (2013.01)

(58) Field of Classification Search
  CPC ............................... B21D 39/06; G11B 5/4826
  See application file for complete search history.

(56) References Cited

U.S. PATENT DOCUMENTS

| | | | |
|---|---|---|---|
| 5,882,198 A * | 3/1999 | Taylor ..................... | A61C 5/42 433/102 |
| 5,948,997 A | 9/1999 | Schmidt | |
| 6,128,164 A | 10/2000 | Kant et al. | |
| 6,141,868 A | 11/2000 | Schmidt et al. | |
| 6,389,684 B1 | 5/2002 | Toensing et al. | |
| 7,633,717 B1 | 12/2009 | Fossum et al. | |
| 8,233,239 B1 | 7/2012 | Teo et al. | |
| 8,520,341 B2 | 8/2013 | Arnone et al. | |
| 2003/0077553 A1* | 4/2003 | Brock ..................... | A61C 5/42 433/102 |
| 2006/0008766 A1* | 1/2006 | Fischer .................... | A61C 3/02 433/102 |

FOREIGN PATENT DOCUMENTS

CA  2497036 C  *  5/2012

OTHER PUBLICATIONS

Dheeravongkit, Arbtip, et al., Design of a Swage Pin without Swage Ball for a Swaging Process in Hard Disk Drive using a Finite Element Method, Institute of Field Robotics, King Mongkut's University of Technology Thonburi, HDD Proceeding, 2012, pp. 65-68, Bangkok, Thailand.
Dheeravongkit, Arbtip, et al., Abstract of Parametric Study of Swage Ball for Hard Disk Drive Swaging Process Using Finite Element Method, Applied Mechanics and Materials, Jan. 2013, 1 page.

* cited by examiner

Primary Examiner — Carl J Arbes
(74) Attorney, Agent, or Firm — John D. Henkhaus

(57) ABSTRACT

A ribbed tapered swage pin includes a head structure at a distal end which has a decreasing taper in the direction of the distal end and one or more ribs or lands positioned around the outer perimeter which, when helically driven, gradually plastically deform the swage boss of one part to form a swage joint with the hole of another part. A swaging tool with which such a swage pin may be used would, therefore, include a rotary actuator and a screw feed for driving the swage pin with a helical rotation and thrust to move through and thereby cold work the swage boss to form the swage joint.

11 Claims, 12 Drawing Sheets

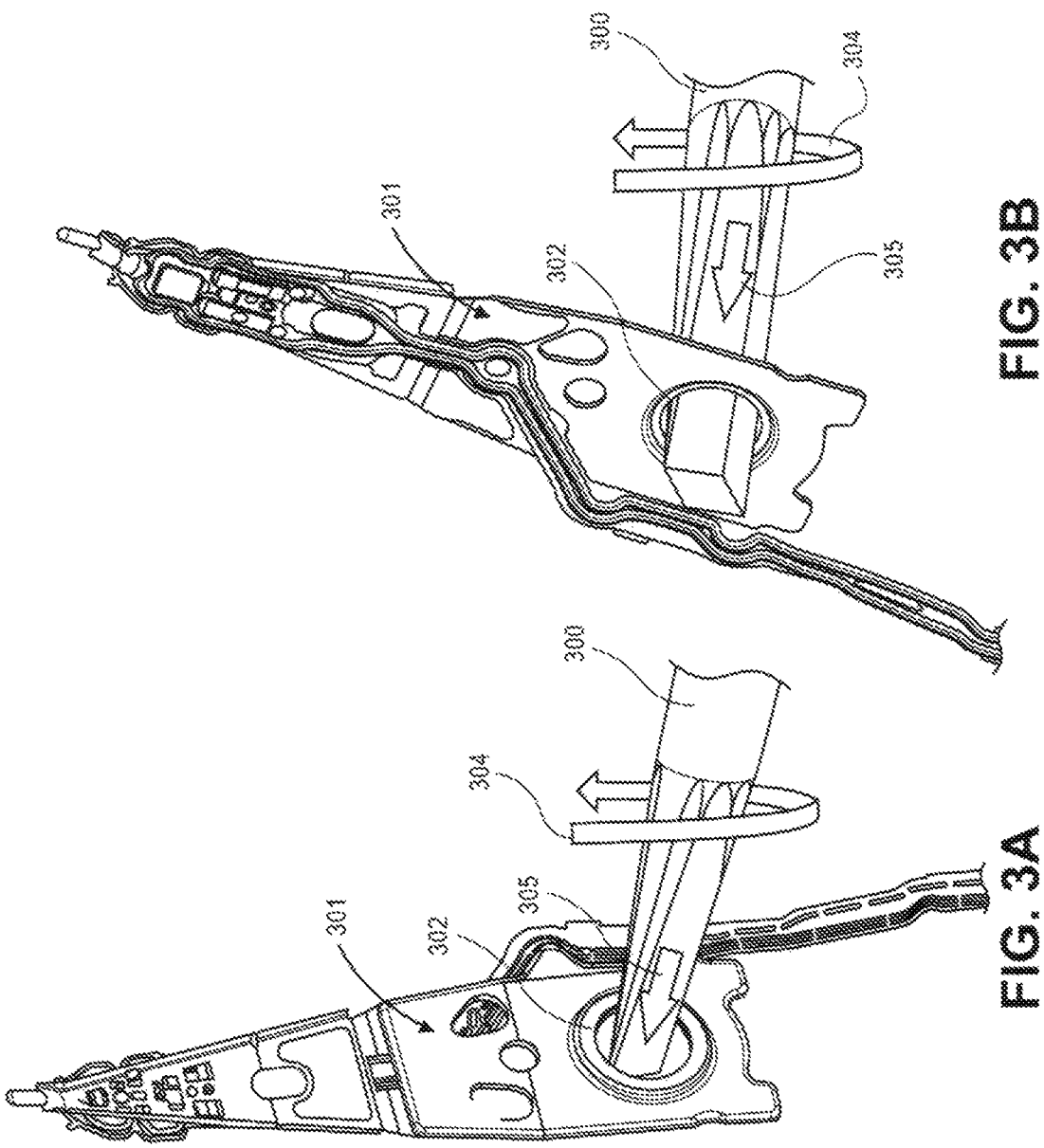

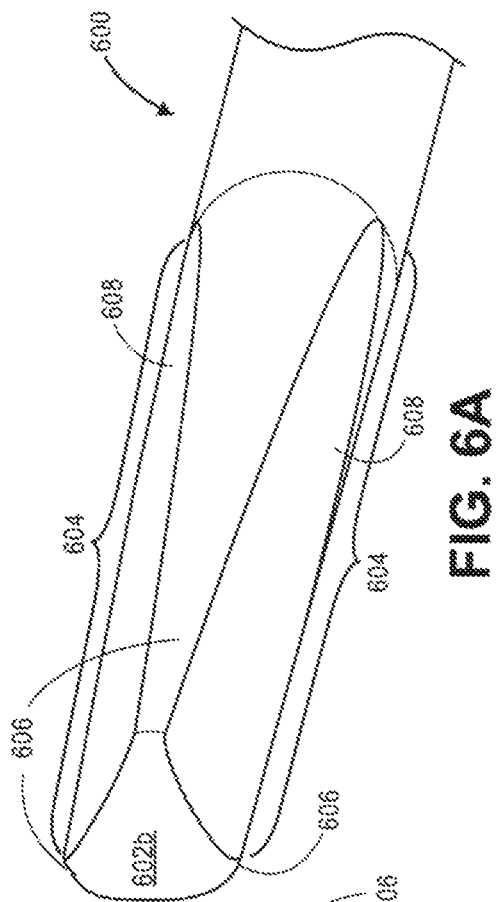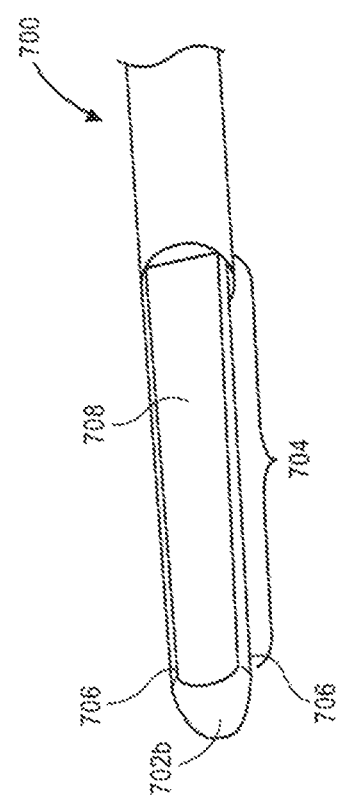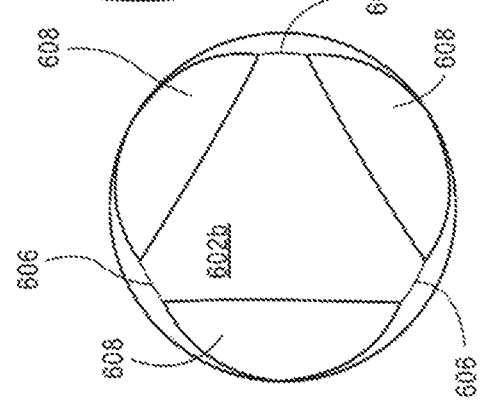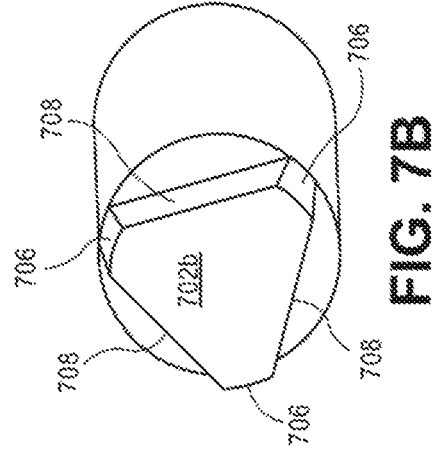

SWAGE PIN HAVING RIBBED TAPER FOR HELICAL SWAGE PROCESS

FIELD OF EMBODIMENTS

Embodiments of the invention may relate generally to a swage procedure and more particularly to a swage pin having internal tapers for a helical swage process.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

In the context of HDD manufacturing, the suspension baseplate of a head-gimbal assembly (HGA) is typically swaged to a corresponding actuator arm of a head stack assembly (HSA). However, existing ball swage processes may undesirably deform the suspension baseplate beyond the actuator arm, thereby affecting the HGA baseplate height and the HGA gramload and the HGA-Slider Pitch Static Angle (PSA).

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 3A and FIG. 3B are each a perspective view, from a different direction, illustrating a ribbed tapered swage pin interacting with a swage boss, according to embodiments;

FIG. 6A is a perspective view illustrating a 3-ribbed swage pin head with a long taper and tapered rib cut, according to an embodiment;

FIG. 6B is a magnified front view illustrating the 3-ribbed swage pin head of FIG. 6A, according to an embodiment;

FIG. 7A is a perspective view illustrating a 3-ribbed swage pin head with a long taper and straight rib cut, according to an embodiment;

FIG. 7B is a magnified perspective view illustrating the 3-ribbed swage pin head of FIG. 7A, according to an embodiment;

DETAILED DESCRIPTION

Approaches to a swage pin and a swaging process utilizing such a swage pin are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Embodiments may be used in the context of mechanically coupling by swaging a head-gimbal assembly (HGA) to a corresponding head stack assembly (HSA) of a digital data storage device such as a hard disk drive (HDD). Thus, in accordance with an embodiment, a plan view illustrating an HDD 100 is shown in FIG. 1 to illustrate an exemplary operating context.

Figure 1:
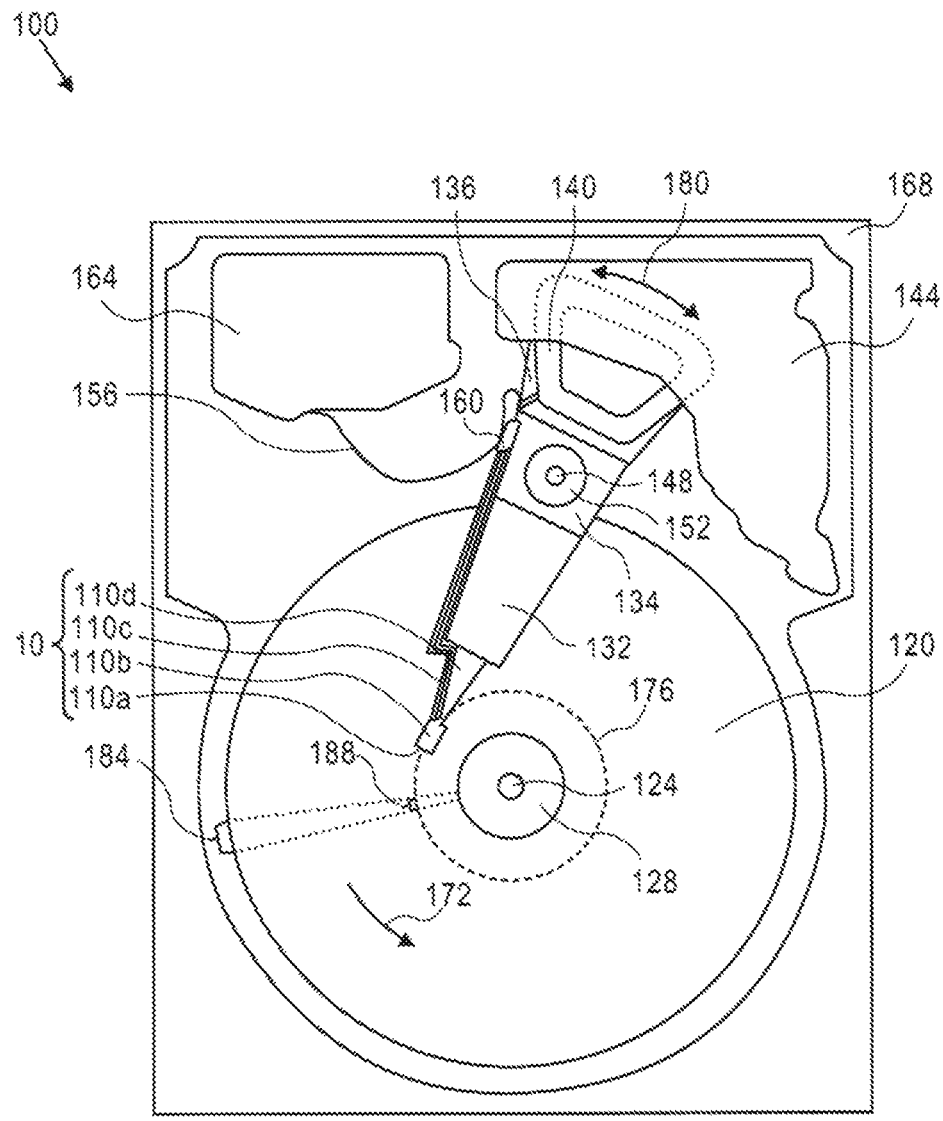
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

INTRODUCTION

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees. Recall that in the context of HDD manufacturing, the suspension baseplate of a head-gimbal assembly (HGA) is typically swaged to a corresponding actuator arm of a head stack assembly (HSA). For example, the use of multiple swage balls in increasing spherical diameters has been used, as well as passing the swage balls in both directions through the HSA. Further, special dry film lubricants have also been used to coat the swage balls, but the principle of using a spherical ball to swage the suspension baseplate to the actuator arm is the same. Thus, because existing ball swage processes may undesirably deform the suspension baseplate, a different approach to swaging is desirable.

Ribbed, Tapered Swage Pins

Figure 2:
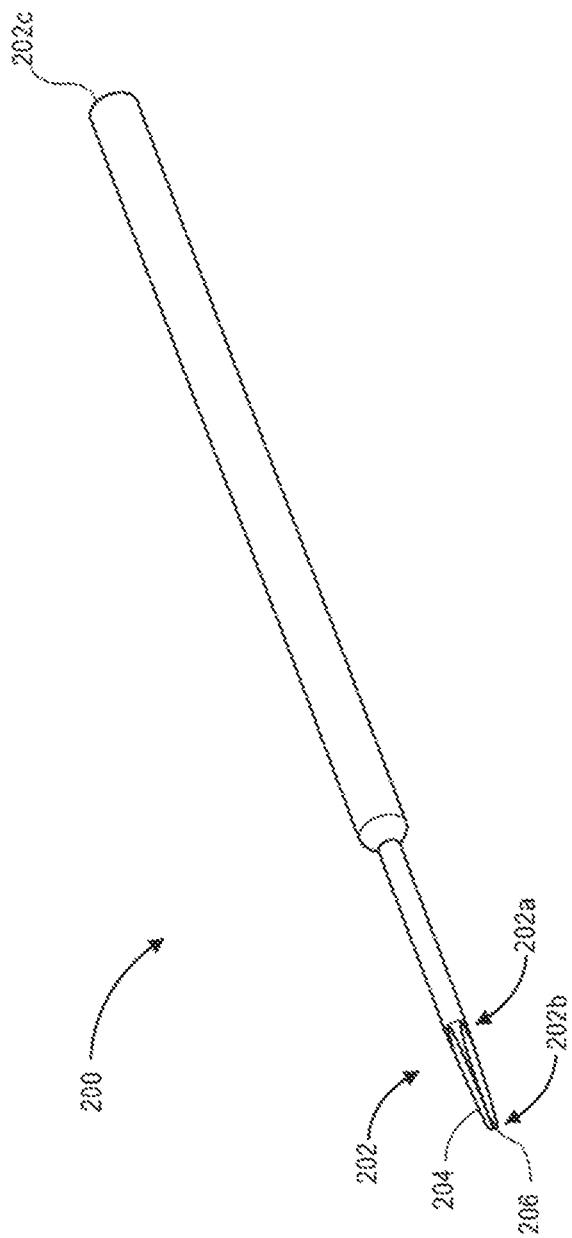
FIG. 2 is a side view illustrating a ribbed tapered swage pin, according to an embodiment.

FIG. 2 is a side view illustrating a ribbed tapered swage pin, according to an embodiment. A swage pin 200 (or "swage driver") comprises a swaging head structure 202 (or simply "swaging structure") that begins at a position 202a along the length of the pin and ends at a distal end 202b of the pin. According to embodiments, the head structure 202 is structurally configured with an increasing taper 204 that begins at the distal end 202b and ends at the position 202a (or a decreasing taper 204 that begins at the position 202a and ends at the distal end 202b), and one or more axial ribs 206 (also referred to as "lands"), positioned around an outer perimeter of the head structure 202. Here, the terms "ribs" and "lands" generally refer to raised structures, bands, ridges, and the like, relative to and separated by flutes, grooves, furrows, and the like, therebetween. The ribs 206 may be linear and axially aligned with the axis of the swage pin 200 (but for any taper associated with the ribs or the head structure, generally), or may be helically axial (see, e.g., swage pin 1200 of FIG. 12) along the axial length of the swage pin 200 from the root (shank) to the tip, i.e., from the position 202a to the distal end 202b. That is not to say that the long axis of ribs 206 is necessarily parallel to the axis of the swage pin body, but that the ribs 206 are generally formed and run in the axial direction of the swage pin 200, rather than in a radial direction of the swage pin 200. A swage pin such as swage pin 200 may be manufactured using a removal process, such as by cutting, machining, grinding, or some other metalworking process or combination of processes known in the art.

As will be illustrated and described elsewhere herein in the context of numerous example embodiments (FIGS. 4-12), the ribs 206 themselves of the swage pin 200 may be tapered or non-tapered (i.e., straight), according to alternative embodiments, despite the head 202 as a whole being tapered in order to enable the use(s) described herein. Similarly, as will be illustrated and described elsewhere herein in the context of the numerous example embodiments, the distal end 202b of the swage pin 202 may be flat or spherical, according to alternative embodiments. Furthermore, portions of a swage pin such as the swage pin 200, between the position 202a and a proximal end 202c, may be circular with a substantially constant diameter or may be circular with a series of multiple diameters (as depicted for swage pin 200).

FIG. 3A and FIG. 3B are each a perspective view, from a different direction, illustrating a ribbed tapered swage pin interacting with a swage boss, according to embodiments. FIGS. 3A, 3B illustrate a swage pin 300 (e.g., a form of the swage pin 200 of FIG. 2, i.e., a 2-rib swage pin in FIG. 3A and a 4-rib swage pin in FIG. 3B for example purposes) being used to create a swage joint between parts or workpieces being joined. For clarity, only one of the parts being joined (here, a suspension assembly 301 for an HDD device), i.e., the part comprising a swage boss 302, is depicted in FIGS. 3A, 3B. FIGS. 3A, 3B further illustrate that use of the swage pin 300 involves concurrently rotating (as depicted by block arrow 304) and thrusting (as depicted by block arrow 305) of the swage pin 300, which together are referred to herein as a helical motion or movement (e.g., helically rotate and thrust). Hence, applying such helical motion to the swage pin 300 to move the swage pin 300 through the swage boss 302 plastically deforms (or "cold works", or "flows") the metal of the swage boss 302 from the inside out to form the desired swage joint between the parts. That is, because the head structure of the swage pin (e.g., head structure 202 of swage pin 200 of FIG. 2) has a very slight taper (e.g., taper 204 of swage pin 200 of FIG. 2), as well as ribs (e.g., ribs 206 of swage pin 200 of FIG. 2) that work against the inside diameter of the swage boss 302, the helical movement of the swage pin 300 by a screw provides both a slow rotation 304 of the swage pin ribs to work against the swage boss 302 as well as a forward thrust 305 of the swage pin 300 increasing in size by the tapered head. The combination of slow rotation and slight taper allows the suspension swage boss to be cold-worked by the ribs in a very gradual manner from the inside out.

Figure 3C:
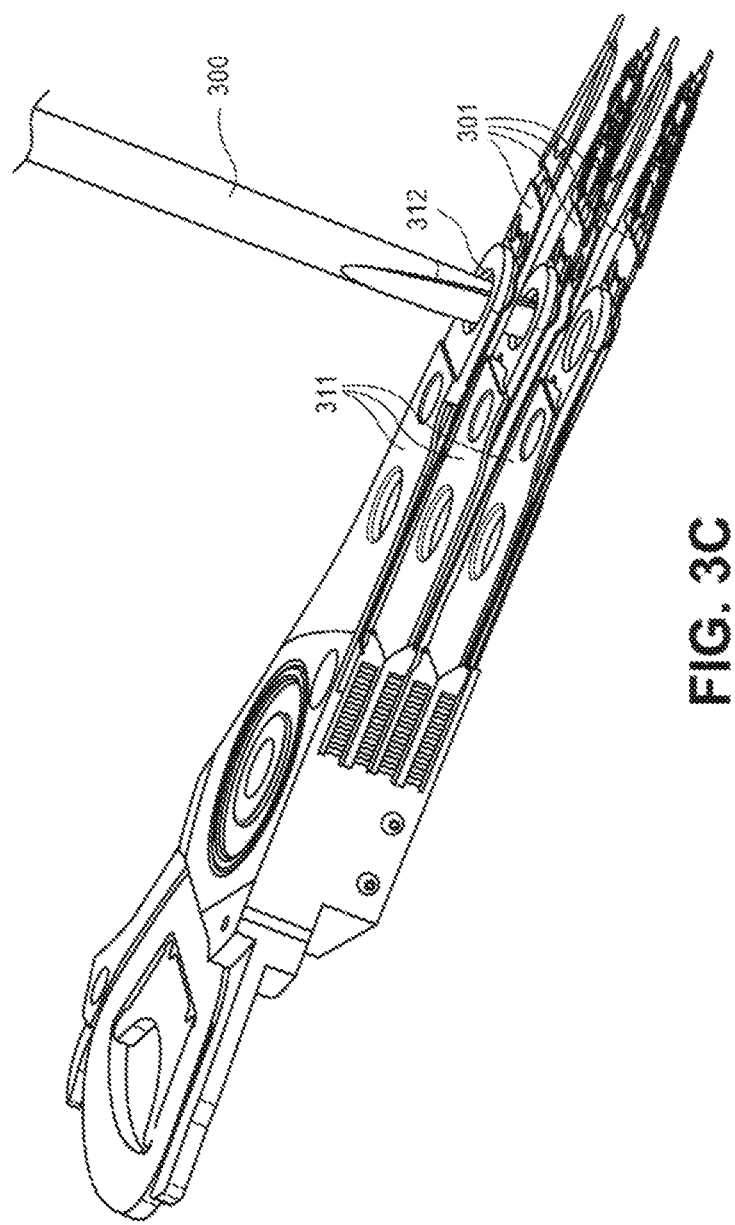
FIG. 3C, FIG. 3D, and FIG. 3E are each a perspective view illustrating a ribbed tapered swage pin forming a swage joint between a head gimbal assembly (HGA) suspension and a head stack assembly (HSA) actuator arm, according to embodiments.
Figure 3D:
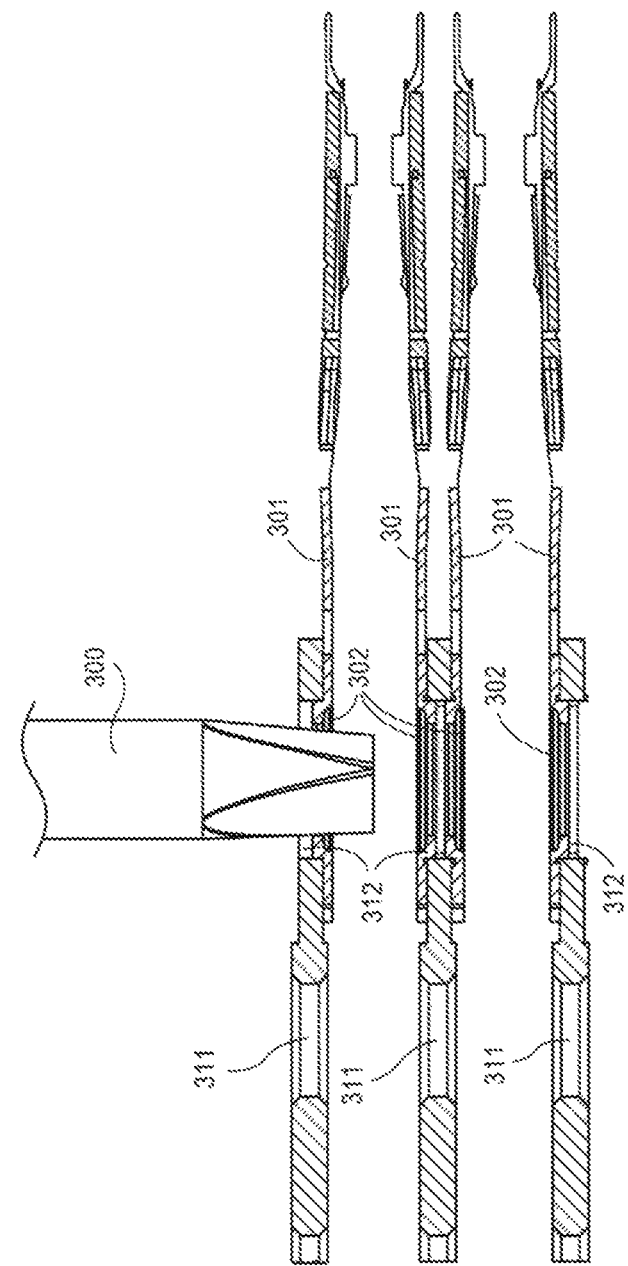
Figure 3E:
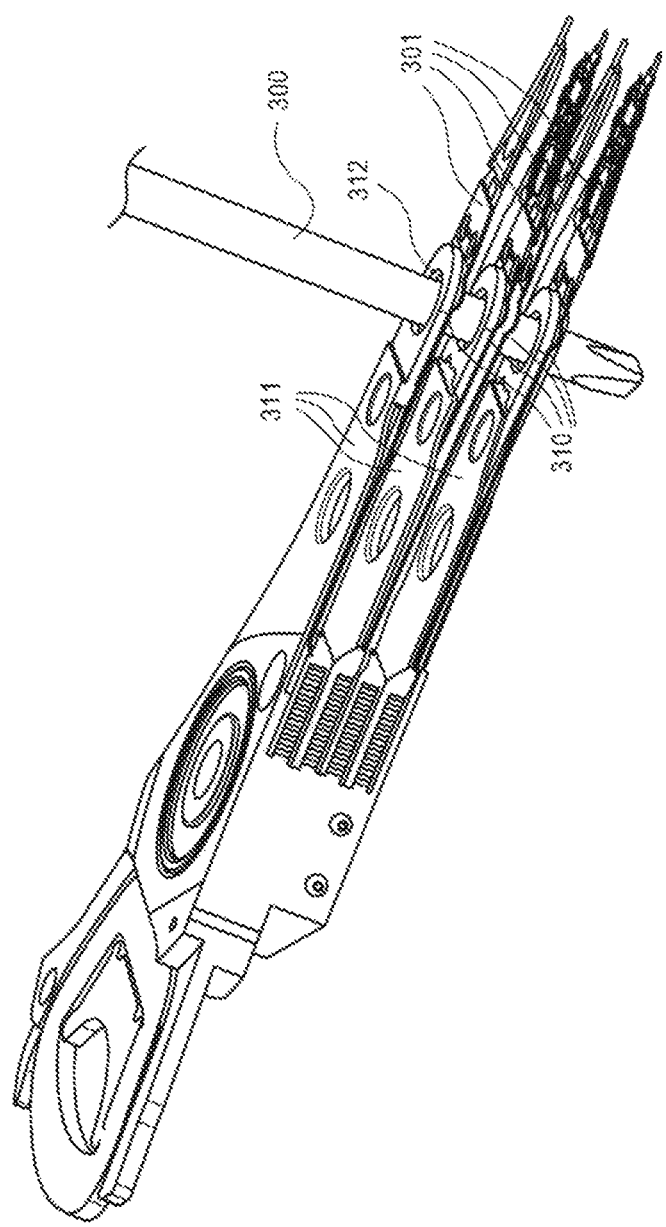

FIG. 3C, FIG. 3D, and FIG. 3E are each a perspective view illustrating a ribbed tapered swage pin forming a swage joint between a head gimbal assembly (HGA) suspension and a head stack assembly (HSA) actuator arm, according to embodiments. FIGS. 3C-3E represent a non-limiting example use, by illustrating a swage pin 300 (e.g., a form of the swage pin 200 of FIG. 2, i.e., a 2-rib swage pin in FIG. 3C, a 3-rib swage pin in FIG. 3D, and a 1-rib swage pin in FIG. 3E for example purposes) being used to create a swage joint 310 between an HGA suspension assembly 301 and an HSA actuator arm 311, by cold working the swage boss 302 of the suspension assembly 301.

In order to enable effectively cold working the metal of the swage boss 302, the various swage pins described herein may be relatively harder than the swage boss being worked. Hence, according to embodiments the various swage pins illustrated and described herein may be composed of titanium carbide or composed of (hardened) tool steel, e.g., a variety of carbon and alloy steels hard enough to be well-suited for use as tools. Furthermore, in view of the use(s) described herein, according to embodiments the various swage pins illustrated and described herein may be coated (e.g., plasma coated) with wear-resistant and/or friction-reducing material(s).

Example Embodiments of Ribbed, Tapered Swage Pins

According to various embodiments, the number of ribs/lands (e.g., ribs 206 of FIG. 2) constituent to a swage pin design, as well as the length of taper (e.g., 204 of FIG. 2), may vary from implementation to implementation based, for example, on the specific swage context (for non-limiting examples, the configuration of parts being swage joined, the type(s) of material of such parts, the quantity of such parts, the swage boss configuration, and the like). Several example embodiments of swage pins according to the teachings herein, comprising combinations and variations of the foregoing general features, are illustrated and described in the following FIGS. 4-12. Note, however, that practice of the teachings herein is not limited to the following examples, as other combinations of features may be implemented and still fall within the general features described herein.

Figure 4:
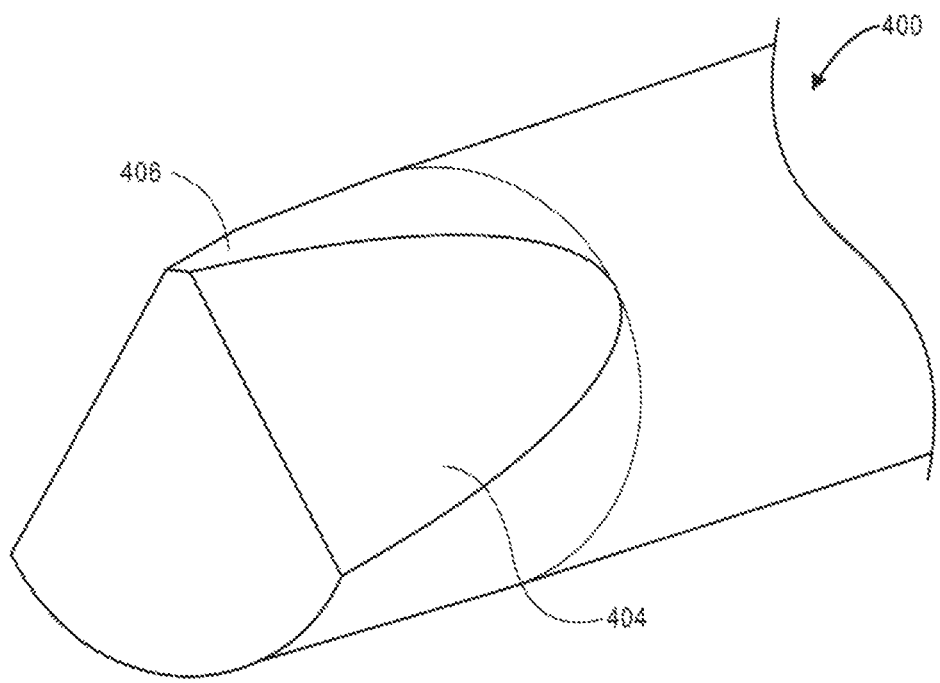
FIG. 4 is a perspective view illustrating a single-ribbed swage pin head with a short taper, according to an embodiment.

FIG. 4 is a perspective view illustrating a single-ribbed swage pin head with a short taper, according to an embodiment. Swage pin 400 comprises a relatively short taper 404 length and a single rib 406.

Figure 5:
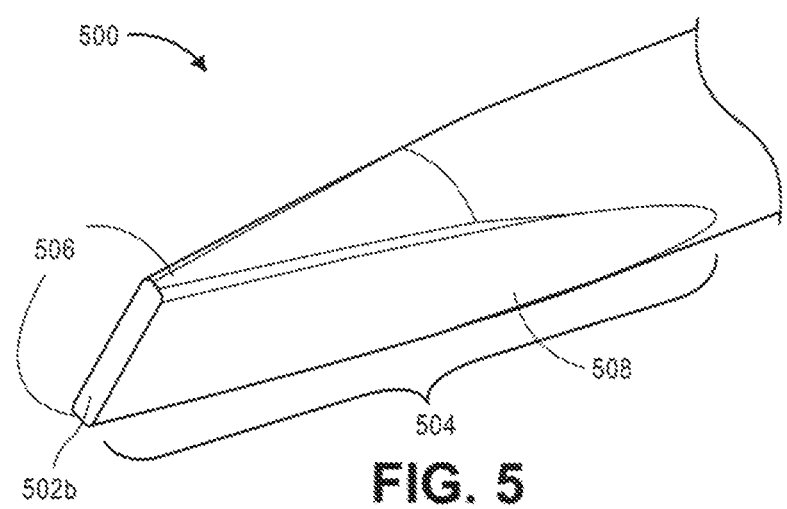
FIG. 5 is a perspective view illustrating a 2-ribbed swage pin head with a short taper, according to an embodiment.

FIG. 5 is a perspective view illustrating a 2-ribbed swage pin head with a short taper, according to an embodiment. Swage pin 500 comprises a relatively short taper 504 length and a dual rib 506 configuration, with a tapered rib cut 508 (i.e., the form of cut to produce the ribs 506), and a flat distal end 502b.

FIG. 6A is a perspective view illustrating a 3-ribbed swage pin head with a long taper and tapered rib cut, and FIG. 6B is a magnified front view illustrating the 3-ribbed swage pin head of FIG. 6A, according to an embodiment. Swage pin 600 comprises a relatively long taper 604 length, three ribs 406, and a tapered rib cut 608 (i.e., the form of cut to produce the ribs 606), with a spherical (rounded) distal end 602b.

FIG. 7A is a perspective view illustrating a 3-ribbed swage pin head with a long taper and straight rib cut, and FIG. 7B is a magnified perspective view illustrating the 3-ribbed swage pin head of FIG. 7A, according to an embodiment. Swage pin 700 comprises a relatively long taper 704 length, three ribs 706, and a straight rib cut 708 (i.e., the form of cut to produce the ribs 706), with a spherical (rounded) distal end 702b.

Figure 8:
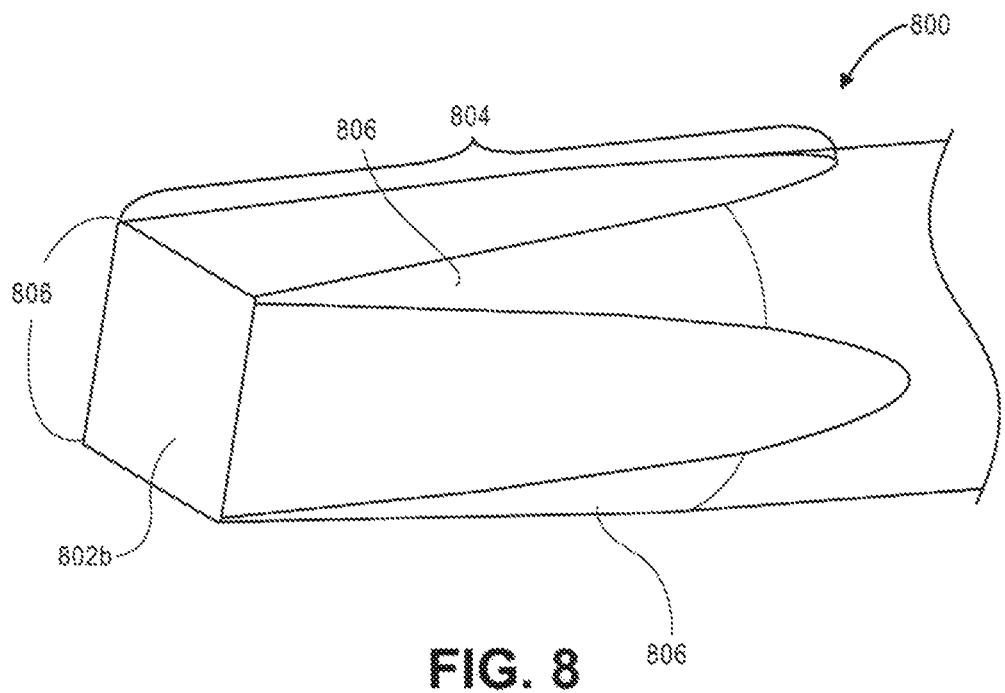
FIG. 8 is a perspective view illustrating a 4-ribbed swage pin head with a short taper, according to an embodiment.

FIG. 8 is a perspective view illustrating a 4-ribbed swage pin head with a short taper, according to an embodiment. Swage pin 800 comprises a relatively short taper 804 length and four ribs 806, with a flat distal end 802b.

Figure 9:
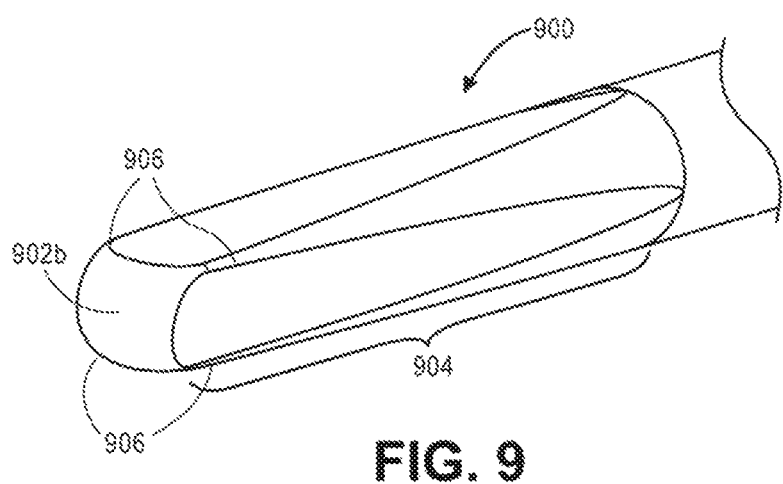
FIG. 9 is a perspective view illustrating a 4-ribbed swage pin head with a long taper, according to an embodiment.

FIG. 9 is a perspective view illustrating a 4-ribbed swage pin head with a long taper, according to an embodiment. Swage pin 900 comprises a relatively long taper 904 length and four ribs 906, with a spherical (rounded) distal end 902b.

Figure 10:
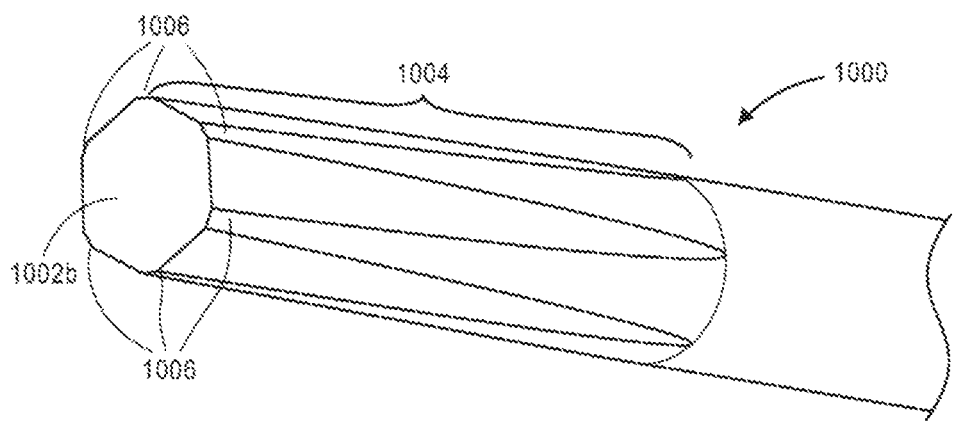
FIG. 10 is a perspective view illustrating a 6-ribbed swage pin head with a long taper, according to an embodiment.

FIG. 10 is a perspective view illustrating a 6-ribbed swage pin head with a long taper, according to an embodiment. Swage pin 1000 comprises a relatively long taper 1004 length and six ribs 1006, with a flat distal end 1002b.

Figure 11:
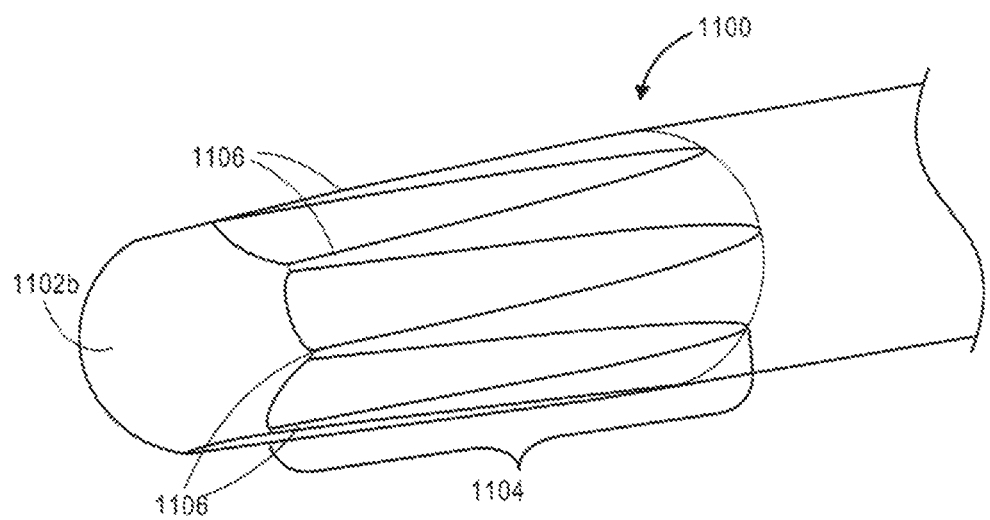
FIG. 11 is a perspective view illustrating a 8-ribbed swage pin head with a long taper, according to an embodiment.

FIG. 11 is a perspective view illustrating a 8-ribbed swage pin head with a long taper, according to an embodiment. Swage pin 1100 comprises a relatively long taper 1104 length and eight ribs 1106 (not all visible here), with a spherical (rounded) distal end 1102b.

Figure 12:
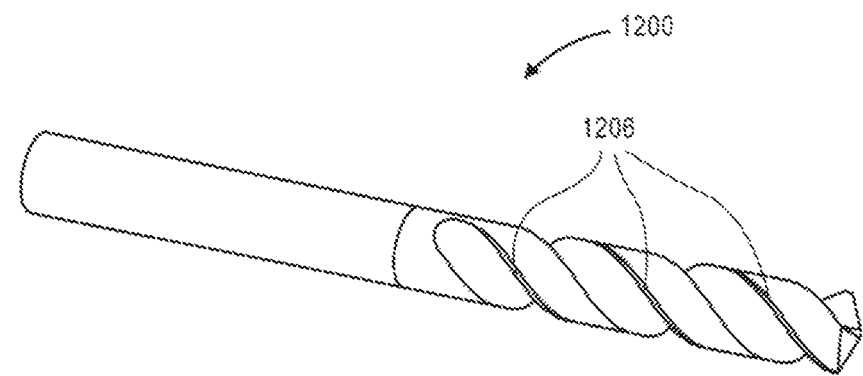
FIG. 12 is a perspective view illustrating a helical swage pin head, according to an embodiment.

FIG. 12 is a perspective view illustrating a helical swage pin head, according to an embodiment. Swage pin 1200 comprises a number of ribs 1206 having a helical form or shape, rather than a linear form as with the foregoing examples. While swage pin 1200 may resemble a common drill bit, the ribs 1206 should be formed to be relatively blunt rather than sharp, and the feed rate and revolutions per minute (RPM) corresponding to the actuation of the swage pin should be such that the swage pin 1200 cold works rather than removes the metal of the metal boss (e.g., swage boss 302 of FIG. 3).

Swaging Tool

Figure 13:
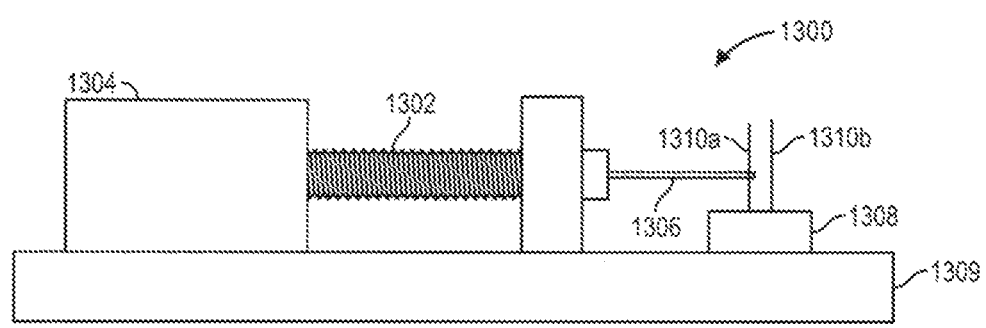
FIG. 13 is a diagram illustrating a swaging tool, according to an embodiment.

FIG. 13 is a diagram illustrating a swaging tool, according to an embodiment. Swaging tool 1300 comprises a feed screw 1302 (or "screw feed") comprising a driving end 1302a and a receiving end 1302b, a rotary actuator 1304 coupled with the driving end 1302a of the feed screw 1302, and a swage driver 1306 (without a swage ball) coupled with the receiving end 1302b of the feed screw 1302, which operates through a similarly threaded feed block 1305. Furthermore, as depicted in FIG. 13, each of the rotary actuator 1304, the feed block 1305 and a mounting structure 1308 may be mounted to a tool base 1309, according to an embodiment.

According to an embodiment, the swage driver 1306 comprises a swaging structure (e.g., swage head 202 of FIG. 2) beginning at a first location (e.g., position 202a of FIG. 2) along the length of the swage driver 1306 and ending at a distal end (e.g., distal end 202b of FIG. 2) of the swage driver 1306, where the swaging structure comprises a decreasing taper from the first location to the distal end (or an increasing taper from the distal end to the first location), and one or more ribs, lands positioned around the perimeter of the swaging structure. Thus, any of the swage pins illustrated and described herein, as well as any other variations thereof that are covered by the broadest teachings herein, may be implemented to operate with the swaging tool 1300. That is, any of swage pin 200 (FIG. 2), 300 (FIGS. 3A, 3B), 400 (FIG. 4), 500 (FIG. 5), 600 (FIG. 6A), 700 (FIG. 7A), 800 (FIG. 8), 900 (FIG. 9), 1000 (FIG. 10), 1100 (FIG. 11), 1200 (FIG. 12), as well as any other variations thereof that are covered by the broadest teachings herein, may be implemented to operate with the swaging tool 1300.

Swaging tool 1300 may further comprise a workpiece mounting structure 1308 for holding a swage boss of a first workpiece 1310a in positional relation within a circular orifice (or simply "hole") of a second workpiece 1310b (workpieces 1310a, 1310b depicted in simplified form, and with exaggerated positional relation to each other). For example, an external swage shuttle may be used to precisely secure the first and second workpieces in place, and the swage shuttle mounted to the swaging tool 1300 by way of a conventional mounting structure 1308 as known in the art. Hence, actuating the rotary actuator 1304 turns the feed screw 1302, which helically rotates and thrusts the swage driver 1306 to move through the swage boss (e.g., swage boss 302 of FIGS. 3A, 3B) and circular orifice of the first and second workpieces 1310a, 1310b, such that the ribs (e.g., ribs 206, 406, 506, 606, 706, 806, 906, 1006, 1106, 1206) of the swage pin 1306 cold-work (plastically deform) the swage boss of the first workpiece 1310a to form a swage joint with the second workpiece 1310b. Note that the first and second workpieces 1310a, 1310b may be positioned within the swaging tool 1300 in either direction, i.e., such that the swage pin 1306 may be fed through the swage boss/orifice mated pair effectively in either direction.

The feed rate of the feed screw 1302 may vary from implementation to implementation, based on a desirable, suitable feed rate for a particular swage context. According to an embodiment, the feed screw 1302 is structurally configured (e.g., screw diameter, thread pitch, and the like) to turn at a particular predetermined feed rate (based on its lead) at which the swage driver 1306 is thrust (e.g., thrust 305 of FIGS. 3A, 3B) to move through the swage boss and the circular orifice. Likewise, the revolutions per minute (RPM) of the feed screw 1302 may vary from implementation to implementation, based on a desirable, suitable RPM for a particular swage context. According to an embodiment, the feed screw 1302 is structurally configured (e.g., screw diameter, thread pitch, and the like) to turn at a particular predetermined RPM at which the swage driver 1306 is helically rotated (e.g., rotation 304 of FIGS. 3A, 3B) to move through the swage boss and the circular orifice.

Method for Swaging

Figure 14:
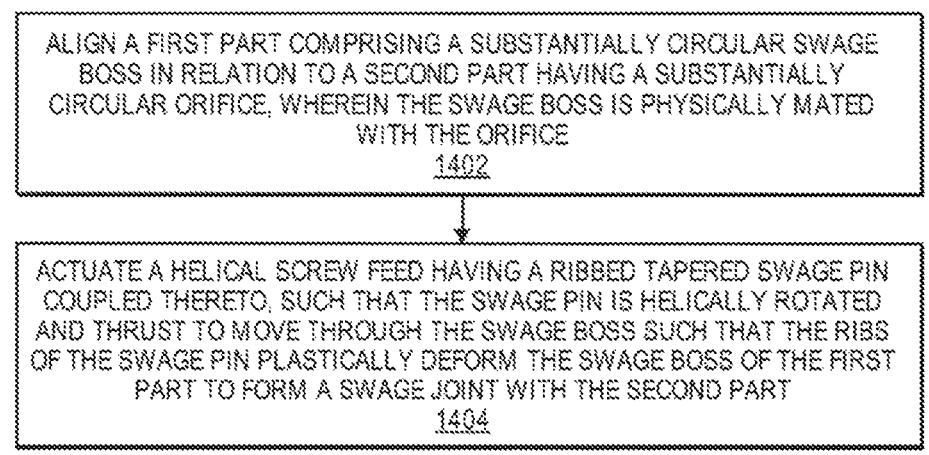
FIG. 14 is a flow diagram illustrating a method for swaging, according to an embodiment.

FIG. 14 is a flow diagram illustrating a method for swaging, according to an embodiment. The various embodiments described in reference to FIG. 14 may each be performed using the swaging tool 1300 (FIG. 13), employing the swage pins 200-1200 (FIGS. 2-12), described elsewhere herein.

At block 1402, a first part comprising a substantially circular swage boss is aligned in relation to a second part comprising a substantially circular orifice, wherein the swage boss is physically mated with the orifice. For example, swage boss 302 (FIGS. 3A, 3B) is physically mated, aligned with a hole or orifice 312 (FIGS. 3C-3E), such as using a swage shuttle aligned with or mounted to a mounting structure 1308 of swaging tool 1300 (FIG. 13).

At block 1404, a helical screw feed that has a ribbed tapered swage pin coupled thereto is actuated such that the swage pin is helically rotated and thrust to move through the swage boss such that the ribs of the swage pin plastically deform the swage boss of the first part to form a swage joint with the second part. For example, helical screw feed 1302 (FIG. 13) that has a ribbed tapered swage pin (swage pins 200-1200 of FIGS. 2-12 and swage pin 1306 of FIG. 13) coupled thereto is actuated by rotary actuator 1304 (FIG. 13) such that the swage pin is helically rotated 304 (FIGS. 3A, 3B) and thrust 305 (FIGS. 3A, 3B) to move through the swage boss 302 such that the ribs 206-1206 (FIGS. 2-12) of the swage pin 200-1200 plastically deform the swage boss 302 of the first part 1310a (FIG. 13) to form a swage joint with the second part 1310b (FIG. 13). As described in reference to FIG. 13, the feed rate and the RPM corresponding to the actuating at block 1404 may vary from implementation to implementation. Optionally, and according to an embodiment, prior to actuating at block 1404, a lubricant is applied to the swage boss 302.

In context of swaging a head gimbal assembly (HGA) suspension base plate to a head stack assembly (HSA) actuator arm for manufacturing a hard disk drive (HDD) sub-component, the gradual cold-working or plastic deformation process described throughout herein has shown with experimentation to provide suitable torque retention (a measure of the strength of the swage joint in torsion) between the base plate swage boss and the actuator arm swage hole for its intended purpose, and to cause less deformation of the base plate in the formation of the swage joint between the suspension swage boss and the actuator arm in comparison with known ball swaging techniques. Stated otherwise, the approaches to swaging described herein provide for uniform cylindrical deformation of the suspension base plate swage boss within the actuator arm swage hole or orifice, while avoiding or inhibiting non-trivial up/down bending of the base plate beyond the actuator arm. Furthermore, by varying combinations of feed rate, RPM, ribs, taper length, and diameter of a swage pin 200 (FIG. 2), the cold working of the swage boss (e.g., swage boss 310 of FIG. 3A, 3B) can be effectively "tuned" for a given implementation.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A swage pin for forming a swage joint between parts, the swage pin comprising:
    a swaging head structure beginning at a first position along the length of the pin and ending at a distal end of the pin, wherein the head structure comprises:
        an increasing taper beginning at the distal end and ending at the first position; and
        one or more continuous structural lands, positioned around an outer perimeter of the head structure and with a rib cut surface on each side, configured to plastically deform material of at least one of the parts.

2. The swage pin of claim 1, wherein at least one of the one or more lands is tapered.

3. The swage pin of claim 1, wherein at least one of the one or more lands is non-tapered.

4. The swage pin of claim 1, wherein the one or more lands is/are helical.

5. The swage pin of claim 1, wherein the distal end is flat.

6. The swage pin of claim 1, wherein the distal end is spherical.

7. The swage pin of claim 1, wherein a length of the swage pin between the first position and a proximal end, opposing the distal end, is cylindrical with a substantially constant diameter.

8. The swage pin of claim 1, wherein a length of the swage pin between the first position and a proximal end, opposing the distal end, is cylindrical with a series of multiple diameters.

9. The swage pin of claim 1, composed of titanium carbide.

10. The swage pin of claim 1, composed of hardened tool steel.

11. The swage pin of claim 1, further comprising:
    a coating of wear-resistant and/or friction-reducing material(s).

* * * * *